US012771560B2

(12) United States Patent
Joshi et al.

(10) Patent No.: US 12,771,560 B2
(45) Date of Patent: Oct. 20, 2026

(54) SECURE FEDERATION OF DATA PROCESSING TASKS

(71) Applicant: Capital One Services, LLC, McLean, VA (US)

(72) Inventors: Rohit Joshi, Glen Allen, VA (US); Sunil Phutela, Chantilly, VA (US); James Kominick, Charlestown, RI (US); Christopher Lee Jacoby, Arlington, VA (US); Kevin Boutarel, Ashburn, VA (US); Andrei-Bogdan Lucescu, Magnolia, TX (US); Hao Cheng, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 11 days.

(21) Appl. No.: 18/887,238

(22) Filed: Sep. 17, 2024

(65) Prior Publication Data

US 2026/0081781 A1 Mar. 19, 2026

(51) Int. Cl.
*H04L 9/32* (2006.01)

(52) U.S. Cl.
CPC .................................. *H04L 9/3271* (2013.01)

(58) Field of Classification Search
None
See application file for complete search history.

(56) References Cited

U.S. PATENT DOCUMENTS 11,233,636 B1 * 1/2022 Peddada ................. H04L 9/085
12,298,953 B1 * 5/2025 Noce ................... G06F 16/2246
2007/0076889 A1 4/2007 DeRobertis et al.
2013/0054967 A1 * 2/2013 Davoust .................. H04L 63/06 713/168
2016/0072781 A1 * 3/2016 Zhang ................. H04L 67/1044 726/4
2016/0330201 A1 * 11/2016 Nguyen-Huu ........ H04L 9/0822
(Continued)

FOREIGN PATENT DOCUMENTS

KR 20100081579 A * 7/2010 ......... H04L 63/0823
WO WO-0145318 A1 * 6/2001 ........... H04L 9/0625

OTHER PUBLICATIONS

Mar. 13, 2023, Joshi, "Navigating Client-Side Encryption," <<https://www.tigrisdata.com/blog/client-side-encryption?>>, 4 pages.
(Continued)

*Primary Examiner* — Benjamin E Lanier
(74) *Attorney, Agent, or Firm* — Banner & Witcoff, Ltd.

(57) ABSTRACT

Systems, methods, and apparatuses are described for securely federating data processing tasks on remote client devices. A computing device may cause one or more remote client devices to securely execute algorithms. The computing device may then receive, from one of those algorithms, a request for secure material usable to process data using the algorithm. The computing device may generate and transmit an encrypted challenge token, and the algorithm may respond with an updated request comprising a processed form of the challenge token. The computing device may then validate the request and, if validation succeeds, transmit the sensitive material. The computing device may then cause the remote client device to process data using the algorithm and the sensitive material.

20 Claims, 6 Drawing Sheets

(56) References Cited

U.S. PATENT DOCUMENTS

| | | | | |
|---|---|---|---|---|
| 2017/0353302 | A1* | 12/2017 | Fernandez | H04L 9/14 |
| 2018/0212785 | A1 | 7/2018 | Peddada et al. | |
| 2019/0050592 | A1* | 2/2019 | Grau | G06F 21/629 |
| 2019/0312878 | A1* | 10/2019 | Brown | H04L 63/045 |
| 2021/0028941 | A1 | 1/2021 | Aizikovich et al. | |
| 2022/0104011 | A1* | 3/2022 | Fischer | H04W 12/0431 |

OTHER PUBLICATIONS

How to implement simple secure client side encryption, Software Engineering, Nov. 8, 2014, <<https://softwareengineering.stackexchange.com/questions/262118/how-to-implement-simple-secure-client-side-encryption>>, 4 pages.

Client-side tokens, date of first publication unknown but, prior to Aug. 26, 2024, <<https://backstage.forgerock.com/docs/idcloud/latest/am-oauth2/client-side-tokdens.html#: : text=Encrypt%tokens,-If%20you%20enable&text=To%20configure%20the%200Auth%202.0,Save%20your%20changes>>, 4 pages.

Client-side Encryption, Wikipedia, <<https://en.wikipedia.org/wiki/Client-side_encryption>>, date of first publication unknown but, prior to Aug. 26, 2024, 3 pages.

What exactly is client-side encryption, <<https://security.stackexchange.com/questions/176376/what-exactly-is-client-side-encryption>>, Dec. 30, 2017, 2 pages.

Oct. 24, 2025—(WO) International Search Repot and Written Opinion—App No. PCT/2025/041848.

* cited by examiner

SECURE FEDERATION OF DATA PROCESSING TASKS

FIELD OF USE

Aspects of the disclosure relate generally to data security. More particularly, aspects described herein describe a process for managing and securing the federation of processes (e.g., algorithms) for processing data onto remote client devices.

BACKGROUND

Organizations often need to store private data (e.g., credit card numbers, social security numbers) in compliance with various standards, such as the Payment Card Industry Data Security Standard (PCI DSS). One approach to securely storing such private data in compliance with PCI DSS is tokenization. Tokenization replaces any data, including sensitive data, with a token. Many tokenization algorithms are based on data, such as so-called cryptographic blobs, which act as a sort of key which may be used to tokenize and/or detokenize data. Tokenization can be reversible (meaning that reversible tokens are mapped to data in a way such that, with the correct cryptographic blob, the reversible tokens can be processed using a detokenization algorithm to return the original data) or irreversible (meaning that, whether or not the cryptographic blob is possessed, it is impossible for any party to recreate the original value from an irreversible token). The approach taken to generate such tokens is quite different: while a reversible token might be generated using an algorithm with various steps (e.g., replacing characters with other characters based on a table and/or all or portions of the cryptographic blob) that can be reversed (e.g., performing those steps in reverse), irreversible tokens are often generated using one-way algorithms.

For data security purposes, it may be desirable to locally, rather than remotely, perform tokenization and/or encryption tasks. In such a scheme, a central third-party server might manage the tokenization/encryption processes of a variety of different devices, with each device performing its own tokenization/encryption. This centralized-management, localized-encryption/tokenization approach has security benefits: after all, such local processing avoids the need for potentially sensitive data to be transmitted over potentially insecure networks. With that said, it may be difficult to centrally manage such local tokenization/encryption tasks in a manner that prioritizes speed and data security. For instance, if a centralized device is tasked with managing cryptographic material (e.g., cryptographic blobs) for local encryption/tokenization, then the transmission process of that cryptographic material can be subject to attack.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to centralized management of local data processing tasks in a manner which ensures the security of the local processing but which permits remote management of those tasks. As will be described in further detail below, a centralized computing device may configure a variety of remote devices with data planes (e.g., logical configurations of processing resources, such as a separate process executing in an operating system). In those data planes, the centralized computing device may cause execution of an algorithm. That algorithm may, in general, be configured to perform data processing tasks (e.g., tokenization, encryption, processing of data using a machine learning model, homomorphic compute, other algorithms using local compute) in response to instruction (and, e.g., receipt of sensitive material, such as a cryptographic blob) from the centralized computing device. The algorithm may also be configured to maintain the security of the data plane in a number of ways: providing periodic heartbeat indications back to the centralized computing device, maintaining all or portions of information (e.g., the algorithm itself, sensitive material(s)) in temporary memory of the remote device(s), and the like. Then, when a remote device with a data plane wishes to process data using the algorithm, it may retrieve the appropriate information (e.g., cryptographic blobs, machine learning data) for such processing from the centralized computing device using a challenge-response and multi-factor authentication process (e.g., mTLS, OAuth, Payload encryption, Signature validation). Particularly, the remote device may first, via the algorithm executing in the data plane, request sensitive material (e.g., a cryptographic blob for tokenization/encryption, a latest version of machine learning model weights) from the centralized computing device. The centralized computing device may respond with an encrypted challenge token, which the remote client device may decrypt and use in formulating an updated version (e.g., second version) of the request for the sensitive material. One reason for this process, as will be described further below, is that it may prevent replay attacks and otherwise validate the correctness of the data plane. Upon validation of those updated versions of the request, the computing device may then provide the requested sensitive data.

More particularly, a computing device may cause a remote client device to execute an algorithm by transmitting, to the remote client device, the algorithm and causing the remote client device to store the algorithm in temporary memory and/or in a protected environment. The algorithm may thereby be secured in that it may execute in a volatile and temporary portion of a computing device, rather than (for example) being stored on more long-term storage (which could be accessed by malicious parties). The computing device may then receive, from an instance of the algorithm executing on the remote client device, a first version of a request for sensitive material usable to process first data. That request might be transmitted over an encrypted pathway, such as a secure tunnel. The computing device may then generate an encrypted challenge token and transmit the encrypted challenge token to the remote client device. Then, the computing device may receive, from the remote client device, a second version of the request for the sensitive material. That second version of the request may comprise a decrypted form of the encrypted challenge token. The computing device may then validate the second version of the request for the sensitive material, transmit, based on the validating the second version of the request for the sensitive material, the sensitive material to the remote client device. The computing device may cause the remote client device to store that sensitive material in temporary memory and/or in a protected environment. The computing device may then cause the remote client device to process the first data based on the sensitive material.

The remote client devices may be configured to report their status periodically and/or the centralized computing devices may be configured to periodically check the status of each federated computing device using a secure communication channel. For example, the computing device may receive, from the instance of the algorithm executing on the remote client device, one or more heartbeat indications. In such an example, validating the second version of the request for the sensitive material may be based on the one or more heartbeat indications. Additionally and/or alternatively, a central computing device might step up authentication requesting additional information from a remote computing device to ensure it's not compromised.

Different algorithms and/or cryptographic material and/or configurations may be provided for different remote client devices. For example, the sensitive material may comprise first sensitive material, and the computing device may store, for a plurality of different remote client devices, a plurality of different sets of sensitive material and then identify, from the plurality of different sets of sensitive material and based on an identifier of the remote client device, the first sensitive material.

Many different approaches may be taken to ensure the security of the algorithm executing on the remote client device. For example, the computing device may establish a secure communication tunnel with the instance of the algorithm executing on the remote client device. In turn, when transmitting the sensitive material to the remote client device, the computing device may transmit the sensitive material via the secure communication tunnel.

The algorithm may be any type of data processing algorithm, such as a tokenization algorithm, an encryption algorithm, a machine learning model, or the like. For example, the algorithm might enable a remote client device to tokenize data using cryptographic material. As another example, processing the first data may comprise causing the remote client device to encrypt the first data. As another example, the sensitive material may comprise at least a portion of a trained machine learning model (e.g., the weights of the model), and the computing device may cause the remote client device to process the first data based on the sensitive material by causing the remote client device to provide, as input to the trained machine learning model, the first data.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
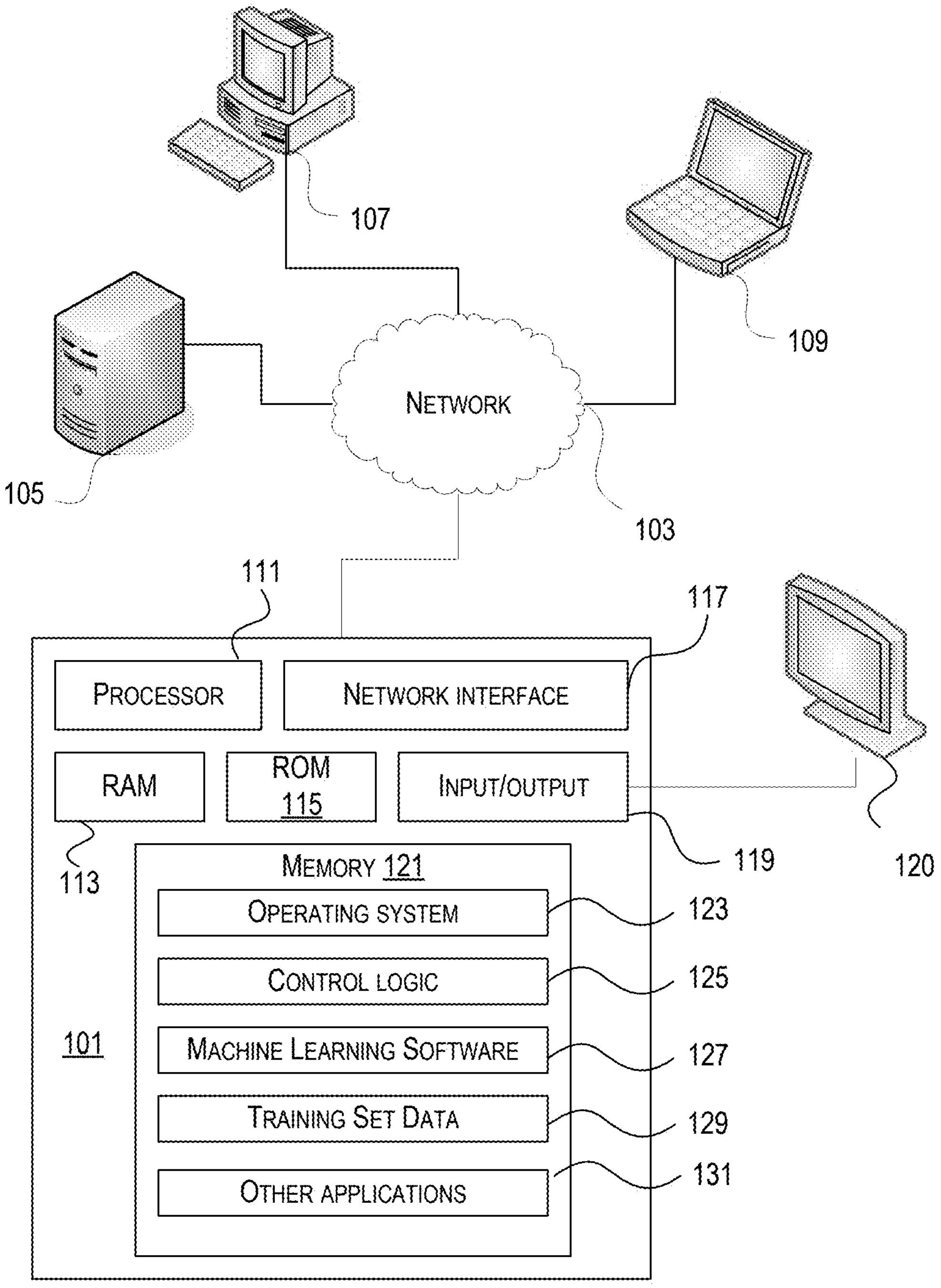
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described herein relate to how a centralized server may securely manage data processing tasks performed locally by various remote client devices. By instantiating algorithms securely on those remote client devices and by managing their execution over time (e.g., by monitoring heartbeats, encrypting communications, and the like), the centralized server may manage the data processing steps performed by those remote client devices in a way that improves security in a number of ways. For example, the federated process described herein allows for the benefits of centralized management of tokenization/encryption (e.g., the centralized management of cryptographic material, the ability to react to new tokenization/encryption needs over time) while simultaneously avoiding the need to transmit the data for tokenization/encryption to the centralized server. One way this process is accomplished is a challenge-response process, whereby requests for sensitive material (e.g., data usable to tokenize, encrypt, or perform machine learning tasks) is only provided after an algorithm decrypts an encrypted challenge token and re-requests the sensitive data with the decrypted form of the challenge token. Such steps may help avoid replay and harvest-now-decrypt-later attacks, thereby helping avoid the possibility that malicious entities collect information about tokenization/encryption schemes. Many other security improvements are described herein: for example, through the use of regular heartbeats, the centralized device can ensure the availability, consistency, and security of algorithms executing on a variety of different remote client devices.

Stated differently, to maximize the performance, security, and flexibility of data processing (e.g., tokenization), described herein may include a system of distributed data processing algorithms. This system may be federated in the sense that the individual algorithms executing on various remote client devices are granted, dynamically at run-time, permissions and material to execute data processing operations under certain circumstances (e.g., for specific types of data). That said, for data security purposes, the remote client devices need not contain all information necessary to perform such data processing. Therefore, to enable such data processing, the algorithms on remote client devices may retrieve sensitive material (e.g., cryptographic material) from a central authority, such as a centralized computing device. This initialization process may thereby provide multiple layers of protection, combining authentication and encryption algorithms to ensure security. In other words, in this system, a centralized computing device may manage all sensitive materials as well as their assignment to remote client devices as requested.

As will be detailed further below, one advantage of this process is that it significantly improves the efficiency of the tokenization/encryption process. In many circumstances, tokenization/encryption processes might be performed locally, and without centralized management. Such lack of centralized management exposes these approaches to significant vulnerability: after all, if a single device is compromised, then the entirety of an encryption/tokenization scheme might also be compromised. On the other hand, in other circumstances, tokenization/encryption processes might be performed remotely, whereby remote client devices must transmit data to a centralized server and receive, in response, a tokenized/encryption form of that data. This centralized approach has numerous advantages: for example, it allows for quick responsiveness to changing encryption/tokenization needs, and in some cases can allow for relatively more computationally complex encryption/tokenization processes. That said, such a process has numerous security issues: after all, it generally involves transmission of private data (e.g., data to be tokenized) over a network such as the Internet. Aspects described herein are in some ways a hybridization of both approaches, allowing for the advantages of centralized management of tokenization/encryption while simultaneously performing such tokenization/encryption locally.

In turn, aspects described herein improve the functioning of computers by improving data and network security. Tokenization and encryption are valuable approaches for securing private data stored by computing devices, but these processes are computationally complex, require as much security as possible, and can be cumbersome to implement. Processes described herein improve the manner in which computers (and, in particular, multiple computers, such as a centralized computing device and one or more remote client devices) can perform such encryption/tokenization, particularly in a manner that is centrally managed but avoids the security issues inherent with such centralized management. No arrangement of humans could perform this process, whether mentally or otherwise at least because the process is fundamentally rooted in computing processes (tokenization/encryption), because the process relies on a particular arrangement of multiple computing devices, and because the process entails a particular structuring of computer data.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language (e.g., Rust, C++) that is subsequently compiled for execution, or may be written in a scripting language such as (but not limited to) Lua and/or Python. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
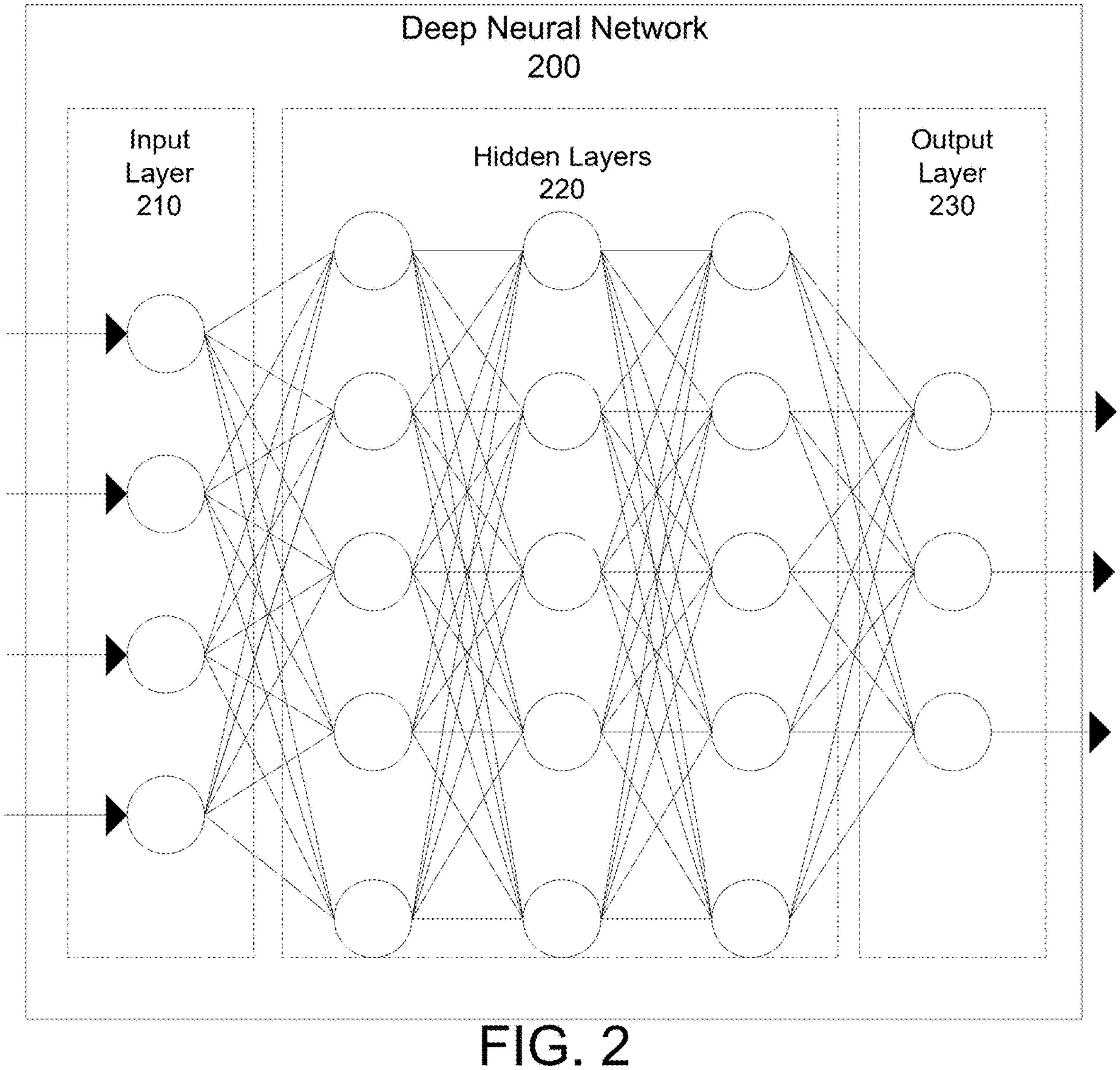
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
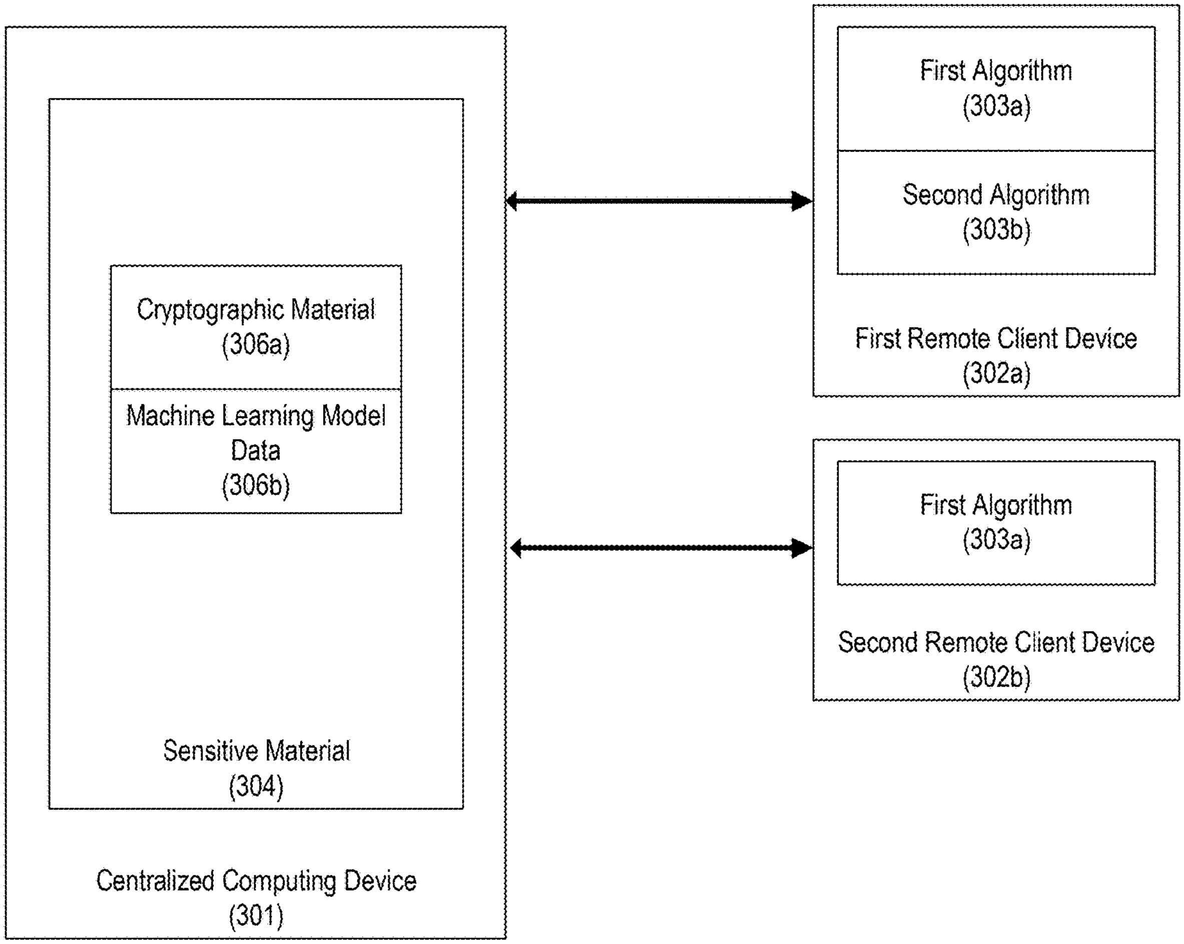
FIG. 3 depicts an illustrative system including a centralized computing device and various remote client devices.

FIG. 3 depicts an illustrative system comprising a centralized computing device 301 communicatively coupled to a first remote client device 302*a* and a second remote client device 302*b*. Any of such devices may be a computing device, such as any of the devices discussed with respect to FIG. 1. Such devices may be communicatively coupled via, for example, a network such as the Internet.

The first remote client device 302*a* and the second remote client device 302*b* are shown as maintaining one or more algorithms. Specifically, the first remote client device 302*a* is depicted as maintaining a first algorithm 303*a* and a second algorithm 303*b*, whereas the second remote client device 302*b* is shown as maintaining the first algorithm 303*a*. Remote client devices, such as the first remote client device 302*a* and the second remote client device 302*b*, may maintain a variety of algorithms (e.g., encryption algorithms, tokenization algorithms, compression algorithms, machine learning algorithms, data security algorithms) which may use sensitive material (e.g., sensitive material 304) to process data fields. For example, the first algorithm 303*a* may comprise a first version of a tokenization algorithm that uses cryptographic blobs to generate tokenized versions of input data, whereas the second algorithm 303*b* may comprise a machine learning algorithm that can use machine learning weights (another possible type of the sensitive material 304) to execute a machine learning model which may receive input and provide output based on that input. Such algorithms may have been received from the centralized computing device 301. For example, the centralized computing device 301 may provide client devices various algorithms, and the client devices may then use those algorithms along with the sensitive material 304 (which may also be received from the centralized computing device 301) to process data.

The centralized computing device 301 may generate and/or maintain the sensitive material 304, which might comprise, for example, cryptographic material 306*a* and/or machine learning model data 306*b*. The sensitive material 304 may comprise any material that may be used by one or more algorithms to process data, and may include data usable to perform encryption, tokenization, to execute machine learning models such as those described with respect to FIG. 2, or the like. The centralized computing device 301 may securely and temporarily store the sensitive material 304 by, for example, storing the material in temporary memory and in an encrypted and/or otherwise protected format. The storage of the material, algorithm, and/or other data in a temporary and/or secure memory may advantageously ensure that the information is not stored on some long-term storage media (e.g., a conventional hard drive or solid state drive) and thereby exposed to access by malicious actors. The centralized computing device 301 may be configured to periodically refresh (e.g., append to) the sensitive material 304. For example, the machine learning model data 306*b* may be periodically updated based on additional training using training data. As another example, the cryptographic material 306*a* used for tokenization and/or encryption may be periodically refreshed.

The centralized computing device 301 may have the ability to remotely control all or portions of remote client devices, such as the first remote client device 302*a* and/or the second remote client device 302*b*. For example, the centralized computing device 301 may be able to send instructions to one or more of the remote client devices that cause them to shut down, delete content (e.g., delete algorithm(s) and/or sensitive data from temporary memory), cause them to perform operations (e.g., process data in accordance with an algorithm), or the like. In this manner, the centralized computing device 301 may have privileged access to all or portions of the computing resources available via the remote client devices. Recognizing that this privileged access might entail security risks, the instruction(s) sent via the centralized computing device 301 may be transmitted via a secure channel, may be encrypted, and/or otherwise might be formatted to ensure authenticity and/or security.

Different sensitive material may be stored for different remote client devices and/or different algorithms. This may mean that the computing device must find and transmit the appropriate sensitive material in response to a request for material. For example, a computing device may store, for a plurality of different remote client devices, a plurality of different sets of sensitive material and then identify, from the plurality of different sets of sensitive material and based on an identifier of a particular remote client device, first sensitive material requested by the particular remote client device.

Cryptographic material, such as the cryptographic material 306*a*, may comprise any data element (e.g., a string, a hash, a series of numbers, a file) usable by a tokenization/encryption algorithm. Generally, the exact processes involved in a tokenization/encryption algorithm are kept secret, as such secrecy aids in the security of the overall tokenization/encryption process. That said, many such algorithms may use cryptographic material (in a variety of formats, such as in a blob-type format) to generate encrypted/tokenized versions of input data. As such, the exact format of the cryptographic material 306*a* may vary based on the field to be processed, the algorithm using the cryptographic material, or the like. For instance, an algorithm may use one format of cryptographic material to tokenize a first data field, but might use an entirely different format of cryptographic material to tokenize a second data field. As another example, one algorithm may use one format of cryptographic material to tokenize a data field, but a different algorithm may use an entirely different format of cryptographic material to tokenize the same data field.

Machine learning model data, such as the machine learning model data 306*b*, may be any data usable, in whole or in part, to implement a machine learning model. For instance, the machine learning model data 306*b* may comprise weights that, when applied to an off-the-shelf machine learning algorithm and/or an artificial neural network as described with respect to FIG. 2, enable a computing device to execute such a machine learning model. In some circumstances, the machine learning model data 306*b* may comprise the data (e.g., weights, connections, layers) generated during training of an artificial neural network. In turn, algorithms, such as the first algorithm 303*a* and/or the second algorithm 303*b*, may rely on and/or otherwise comprise machine learning as described above with respect to FIG. 2. For example, an algorithm may use a machine learning model implemented via an artificial neural network to perform a data processing task, such as categorizing data, performing regression on a dataset, predicting future data, generating new data based on an input string, performing encryption/tokenization, or the like.

Though FIG. 3 depicts a model whereby the centralized computing device 301 is separate from remote client devices such as the first remote client device 302*a* and the second remote client device 302*b*, in some circumstances a peer-to-peer style system may be set up whereby all devices in the system act like the remote client devices. In other words, rather than centralized management of sensitive material and/or algorithms, a similar process may be performed, with one remote client device taking on the roles described herein for the centralized computing device 301. In this manner, rather than running a single server, sensitive data and/or algorithms may be propagated and/or managed in a peer-to-peer manner. To perform this process, the algorithm(s) executing on remote client devices may be capable of storing, generating, and/or transmitting sensitive material to other remote client devices, even when such sensitive material is not itself usable by those remote client devices. Similarly, the algorithm(s) executing on remote client devices may be capable of storing, generating, and/or transmitting the same or wholly different algorithms to other remote client devices.

Figure 4:
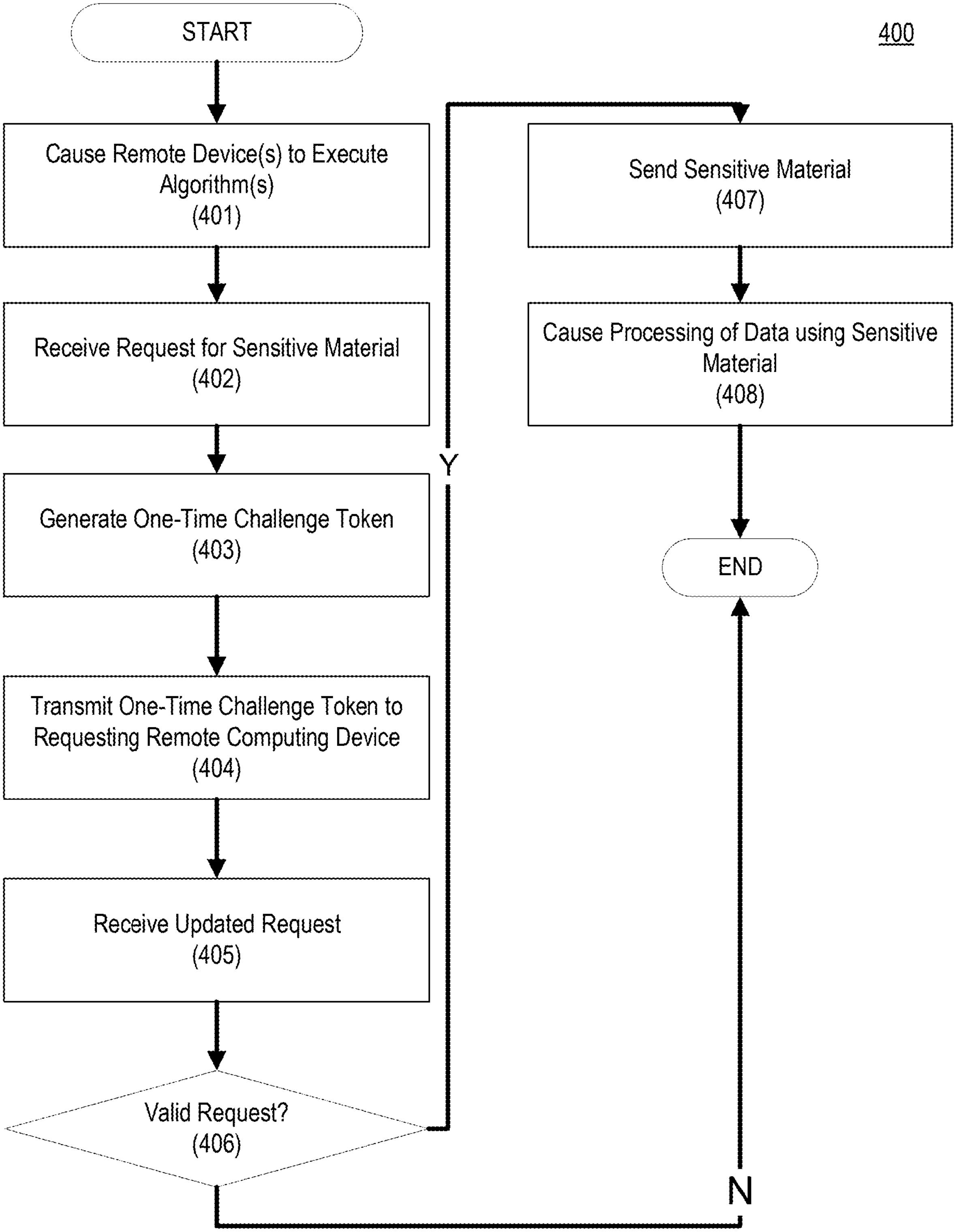
FIG. 4 depicts steps of a method for securely federating data processing tasks on remote client devices.

FIG. 4 depicts a method 400 comprising steps for securely federating data processing tasks on remote client devices. The method 400 may be performed by a computing device, such as any one of the devices described with respect to FIG. 1, FIG. 2 and/or FIG. 3, such as the centralized computing device 301, the first remote client device 302*a*, and/or the second remote client device 302*b*. The steps shown in FIG. 4 are illustrative, and may be re-arranged, omitted, and/or modified as desired. A computing device may comprise one or more processors and memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 401, a computing device may cause one or more remote client devices to execute one or more algorithms. This process may involve transmitting one or more algorithms to remote client devices and/or managing the process with which those remote client devices receive, store, and/or execute those algorithms. For example, the computing device may cause a remote client device to execute an algorithm by transmitting, to the remote client device, the algorithm and causing the remote client device to store the algorithm in temporary memory. In turn, one or more remote client devices may be configured to execute the algorithms in a secure portion of their computing resources. For example, the algorithms may be executed in a separate part of memory, may be logically separated from other processes executing on an operating system, or the like. Such algorithms might nonetheless be used by the one or more remote client devices in a variety of ways: for example, in some instances an algorithm might be implemented as a Dynamic Link Library (DLL), whereas in others it may be implemented as a separate executable process.

As part of causing one or more remote client devices to execute an algorithm, the computing device may take one or more steps to secure execution of the algorithm and/or transmissions to/from the algorithm. This process may involve securely authenticating the one or more remote client devices, such as by authenticating those one or more remote client devices in accordance with an authentication standard. Additionally and/or alternatively, trusted communications mechanisms may be established between the computing device and the one or more remote client devices. For example, the computing device may establish a secure communication tunnel with the instance of the algorithm executing on the remote client device. In such circumstances, subsequent transmissions between the computing device and the one or more remote client devices (e.g., requests for sensitive material, transmissions of that sensitive material) may be via such a secure communication tunnel.

One way in which the algorithm(s) executing on a remote client device may be secured involves use of National Institute of Standards and Technology (NIST)-approved encryption schemes. Such schemes may be used to securely instantiate algorithms on remote client devices. For instance, as part of causing the one or more remote client devices to execute an algorithm, the centralized computing device may require that the algorithm is registered with the centralized computing device (e.g., using a unique identifier), that the algorithm is instantiated and/or otherwise signed with unique information, and that (as will be described in further detail below) all requests for sensitive material from the algorithm are individually validated.

Algorithms executing on remote devices may be configured to periodically check in with the computing device. Because centralized computing devices such as the centralized computing device 301 might not have direct access to information about the execution of various algorithms, regularized reporting messages from those algorithms might help the centralized computing device verify the operation of those algorithms. In turn, the existence (or non-existence) of a heartbeat message from an algorithm executing on a remote client device might indicate whether an algorithm is successfully executing on the remote client device. For example, the computing device may receive, from the instance of the algorithm executing on the remote client device, one or more heartbeat indications. The content of those heartbeat messages may vary: some might be simplistic and simply confirm ongoing execution of an algorithm, while others might comprise a time-based unique rolling code that securely confirms the ongoing execution of the algorithm. No matter how implemented, and as will be described below, these periodic check-ins may be usable to validate request(s) for sensitive material, as they might indicate the health and/or operating status of an algorithm.

Discussion will now turn to steps which may be performed to provide sensitive material (such as the sensitive material 304) to a requesting remote client device. These steps may follow operation of one or more algorithms on one or more remote client devices. For example, these steps may be part of the process whereby a remote client device (e.g., the first remote client device 302*a*) uses an algorithm (e.g., the first algorithm 303*a*) to tokenize and/or encrypt data using cryptographic material (e.g., the cryptographic material 306*a*). Additionally and/or alternatively, these steps may be part of the process whereby a remote client device (e.g., the first remote client device 302*a*) uses an algorithm (e.g., the first algorithm 303*a*) to execute a machine learning model based on training data received from the centralized computing device (e.g., the machine learning model data 306*b*).

In step 402, the computing device may receive a request for sensitive material. The request for sensitive material may be received from an algorithm executing on a remote client device, and may be part of that algorithm being used to (for instance) encrypt data, tokenize data, process data using a trained machine learning model, or the like. For example, the computing device may receive, from an instance of the algorithm executing on the remote client device, a first version of a request for sensitive material usable to process first data.

The request for sensitive material received in step 402 need not comprise the data to be processed (e.g., encrypted, tokenized, input into a machine learning model). Indeed, one advantage of the federated model described herein is that, because the data to be processed is not transmitted to the centralized computing device 301, that data is kept more secure. After all, if such data were required to be transmitted (e.g., over the Internet), then there might be a slightly greater likelihood that the data may be accessed by a malicious entity.

In step 403, the computing device may generate a challenge token, and in step 404, the computing device may transmit the challenge token to the requesting remote device. The challenge token may be time-limited (e.g., only valid for a certain period of time), may be a one-time token (e.g., only usable for a particular request), and the like. For example, the computing device may generate and transmit an encrypted one-time challenge token to the remote client device. Broadly, and as will be elaborated in greater detail below, one reason this challenge token may be generated is to confirm the proper operation of an algorithm executing on a remote client device. For instance, by sending an encrypted challenge token and requiring that an algorithm on a remote client device provide an updated request for sensitive material comprising a decrypted form of that challenge token, then the computing device can verify (among other things) that the algorithm is performing as expected, that there is not a man-in-the-middle device performing malicious activity (e.g., a replay attack, an attempt to maliciously collect sensitive material), and the like.

The challenge token may be encrypted using a key. For instance, the centralized computing device may use a private key to encrypt an arbitrary string to generate an encrypted challenge token, and the encrypted challenge token may be decryptable by a public key accessible to an algorithm. The public and private key pair may be changed periodically, such that algorithms might be required to acquire new public keys on a periodic basis. One advantage to this process might be that it provides the centralized computing device an opportunity to selectively and remotely disable algorithms: for example, if the second remote client device 302*b* becomes untrusted (e.g., due to a security breach), one way to prevent malicious use of the first algorithm 303*a* executing on the second remote client device 302*b* may be to refuse to provide an updated public key to the first algorithm 303*a* executing on the second remote client device 302*b*.

In step 405, the computing device may receive an updated request. The updated request may be based on processing, by the remote client device, of the challenge token. That processing may reflect some form of manipulation of the challenge token, such as decryption, decryption and re-encryption, addition of some sort of additional value (e.g., a second key, a second rolling code), or the like. For example, the computing device may receive, from the remote client device, a second version of the request for the sensitive material. In such an example, the second version of the request may comprise a processed (e.g., decrypted) form of the encrypted challenge token.

In step 406, the computing device may determine whether the updated request received in step 405 is valid. For example, the computing device may validate the second version of the request for the sensitive material. If the request is valid, the method 400 may proceed to step 407. Otherwise, the method 400 may end.

Validating the request received in step 405 may comprise confirming that the remote client device that transmitted the request is authorized to execute the algorithm. Different remote client devices may be entitled to execute different algorithms under various circumstances. For instance, the first remote client device 302*a* may be entitled to perform tokenization and/or encryption tasks but not execute machine learning models, whereas the second remote client device 302*b* may be entitled to execute machine learning models but not perform tokenization and/or encryption tasks.

Validating the request received in step 405 may comprise validating authentication credentials in the request. The request received in step 405 may comprise one or more authentication credentials (e.g., a username, password, rolling code, certificate), and validating the request may comprise comparing such authentication credentials against stored authentication credentials.

Validating the request received in step 405 may comprise validating information about the data to be processed by the remote client device. Algorithms such as the first algorithm 303*a* and the second algorithm 303*b* may be data type-specific: for example, the first algorithm 303*a* may be a tokenization algorithm for customer names, whereas the second algorithm 303*b* may be a tokenization algorithm for customer addresses. In turn, the request may indicate a type of data to be processed (e.g., customer name, customer address), and the centralized computing device may determine whether to validate the request (and, in turn, send the sensitive material) if the data type is appropriate for the algorithm.

Validating the request received in step 405 may comprise evaluating one or more heartbeat indications received from an algorithm. As indicated above, periodic heartbeat indications received from algorithms executing on remote client devices may indicate the operational status of those algorithms. After all, if such heartbeat indications stop being received, this may indicate a malfunction of the algorithm, malicious activity, or the like. In turn, the computing device may, as part of validating the request received in step 405, confirm that a sufficient number of heartbeat indications have been received in a time period.

In step 407, the computing device may send the sensitive material. For example, the computing device may transmit, based on the validating the second version of the request for the sensitive material, the sensitive material to the remote client device. The sensitive material may be transmitted in a secure manner, such as over a trusted channel. Additionally and/or alternatively, the sensitive material may be encrypted using a private key, and then transmitted to the requesting algorithm for decryption using a public key.

The challenge-response process described in step 402 through step 406 may be performed before the algorithm itself is received and/or executed (e.g., as described above with respect to step 401). For example, in some circumstances, the algorithm itself may be transmitted along with sensitive data (e.g., step 401 may be merged into step 407). In such an example, the request(s) received from the remote client device might not be received from the algorithm itself, but some other process executing on the remote client device. As another example, the algorithm might be transmitted but not executed until sensitive data is received. As yet another example, various different challenge-response processes may be performed, with some performed before the algorithm is executed (and performed to simply validate the operation of a remote client device, whether or not the algorithm is executed), whereas others might be performed during or after algorithm execution.

In step 408, the computing device may cause processing of data using the sensitive material. For example, the computing device may cause the remote client device to process the first data based on the sensitive material. Such processing may include tokenizing data using the sensitive material (e.g., tokenizing using cryptographic material, such as a cryptographic blob). Such processing may additionally and/or alternatively include encrypting data using the sensitive material (e.g., encrypting using cryptographic material, such as a cryptographic blob). Such processing may involve using the sensitive material (e.g., weights of machine learning model training data) to execute a trained machine learning model and providing, to that trained machine learning model, input data.

To provide an example of how the above process would operate in the machine learning context, assume that the first remote client device 302*a* executes a machine learning algorithm as the first algorithm 303*a*. In such a circumstance, the centralized computing device 301 may receive a request for the machine learning model data 306*b*, a form of the sensitive material 304. In such a circumstance, the steps described above may be used to validate the request for the machine learning model data 306*b*. Upon successful validation, the machine learning model data 306*b* may be transmitted to the first algorithm 303*a* executing on the first remote client device 302*a*, which may use that data to execute a trained machine learning model and provide, to the trained machine learning model, input data for processing.

To provide an example of how the above process would operate in the tokenization context, assume that the first remote client device 302*a* executes a tokenization algorithm as the first algorithm 303*a*. In such a circumstance, the centralized computing device 301 may receive a request for the cryptographic material 306*a*, which may be usable to tokenize data. In such a circumstance, the steps described above may be used to validate the request for the cryptographic material 306*a*. Upon successful validation, the cryptographic material 306*a* may be transmitted to the first algorithm 303*a* executing on the first remote client device 302*a*, which may use that data to tokenize data as desired.

Figure 5:
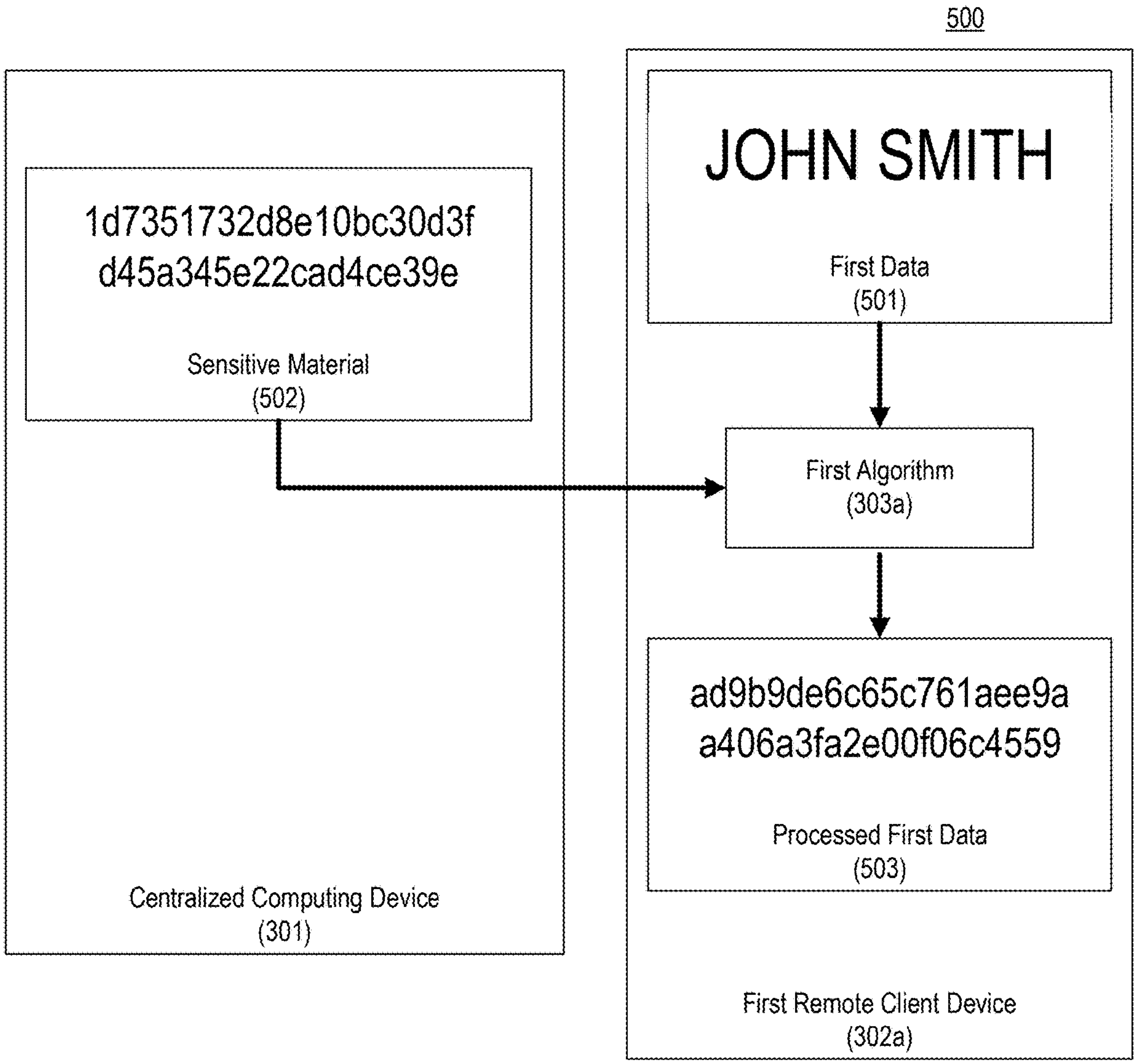
FIG. 5 depicts an illustrative flow of data being processed by a remote client device.

FIG. 5 depicts an illustrative flow 500 of data being processed by a remote client device. As shown in the illustrative flow 500, the first remote client device 302*a* maintains first data 501—in this example, the name "John Smith." To tokenize the first data 501 using the first algorithm 303*a* (in this example, a tokenization algorithm), the first remote client device 302*a* may (e.g., in the processes described in step 402 through step 407 of FIG. 4) request and receive sensitive material 502 (in this example, an arbitrary series of numbers and letters). The first algorithm 303*a* may then use the sensitive material 502 to tokenize the first data 501, generating processed first data 503.

Figure 6:
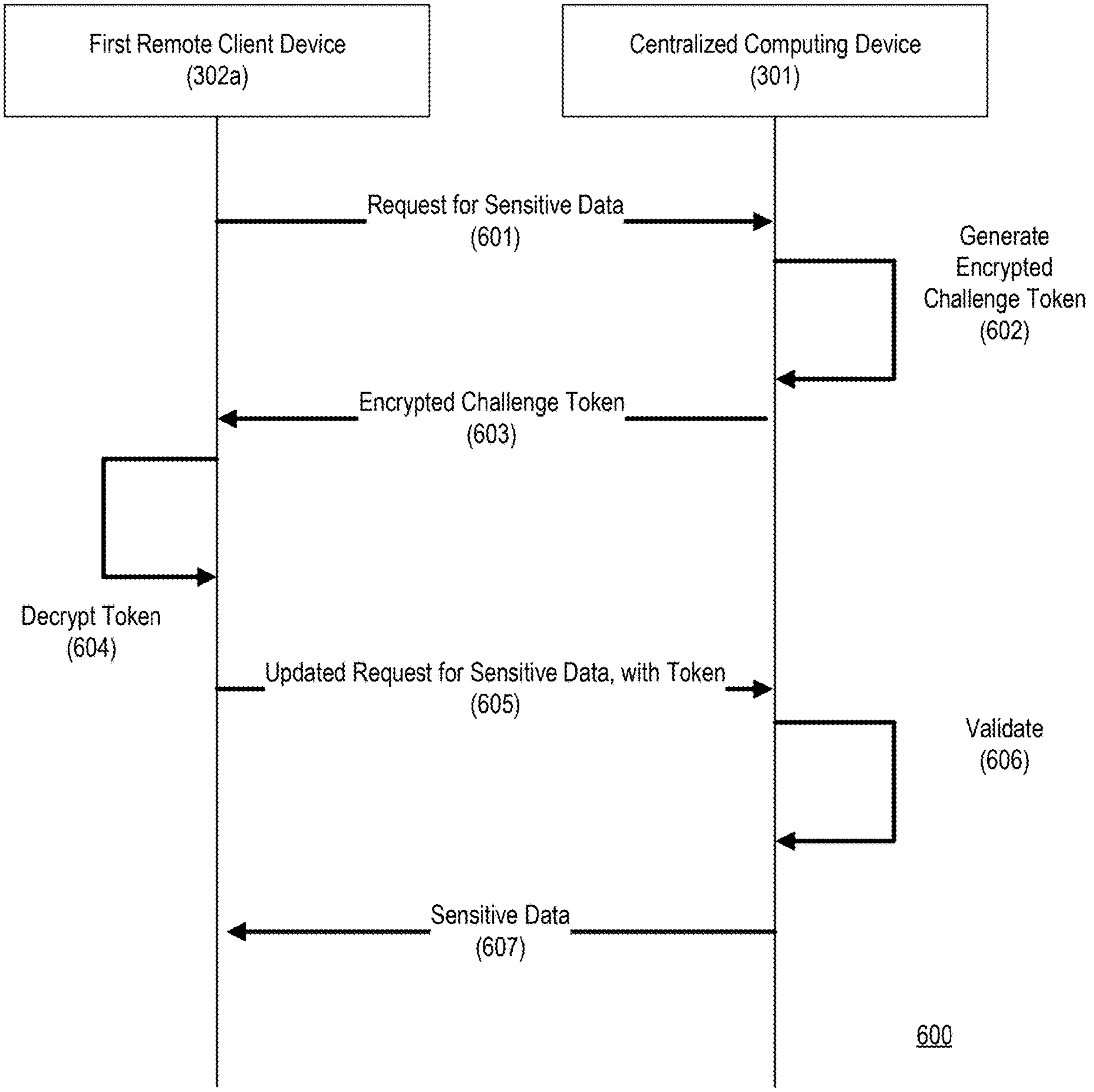
FIG. 6 is a messaging flow for challenge tokens.

FIG. 6 depicts a message flow 600 for challenge tokens, such as the one-time, time-limited challenge tokens referenced in step 404 of FIG. 4. In step 601, the first remote client device 302*a* may send, to the centralized computing device 301, a request for sensitive data. This step may be the same or similar as step 402 of FIG. 4. In step 602, the centralized computing device 301 may generate an encrypted challenge token. This step may be the same or similar as step 403 of FIG. 4. As part of that generation process, the challenge token may be configured to be time-limited, one-time-use, or similarly limited. In step 603, the centralized computing device 301 may send, to the first remote client device 302*a*, the encrypted challenge token. This step may be the same or similar as step 404 of FIG. 4. In step 604, the first remote client device 302*a* may decrypt the received token. In step 605, the first remote client device 302*a* may send, to the centralized computing device 301, an updated request for the sensitive data that includes the decrypted token. This step may be the same or similar as step 405 of FIG. 4. In step 606, the centralized computing device 301 may validate the updated request for the sensitive data. This step may be the same or similar as step 406 of FIG. 4. Then, in step 607, the centralized computing device 301 may send, to the first remote client device 302*a* and based on the validating in step 606, the sensitive data. This step may be the same or similar as step 407 of FIG. 4.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to securely federate data tokenization tasks on remote client devices, the computing device comprising:

one or more processors; and memory storing instructions that, when executed by the one or more processors, cause the computing device to:

cause a remote client device to execute an executable tokenization algorithm by:

transmitting, to the remote client device, the executable tokenization algorithm; and causing the remote client device to store the executable tokenization algorithm in temporary memory;

receive, from an instance of the executable tokenization algorithm executing on the remote client device, a first version of a request for sensitive material usable to tokenize first data;

transmit an encrypted challenge token to the remote client device;

receive, from the remote client device, a second version of the request for the sensitive material, wherein the second version of the request comprises a decrypted form of the encrypted challenge token;

validate the second version of the request for the sensitive material;

transmit, based on the validating the second version of the request for the sensitive material, the sensitive material to the remote client device;

cause the remote client device to tokenize the first data based on the sensitive material by causing the remote client device to:

generate, by using the executable tokenization algorithm to process the sensitive material, a token that represents a sensitive portion of the first data; and replace the sensitive portion of the first data with the token; and cause the remote client device to delete:

the executable tokenization algorithm from the temporary memory; and the sensitive material.

2. The computing device of claim 1, wherein the instructions, when executed by the one or more processors, cause the computing device to:

receive, from the instance of the executable tokenization algorithm executing on the remote client device, one or more heartbeat indications, wherein the instructions, when executed by the one or more processors, cause the computing device to validate the second version of the request for the sensitive material based on the one or more heartbeat indications.

3. The computing device of claim 1, wherein the sensitive material comprises first sensitive material, and wherein the instructions, when executed by the one or more processors, cause the computing device to:

store, for a plurality of different remote client devices, a plurality of different sets of sensitive material; and identify, from the plurality of different sets of sensitive material and based on an identifier of the remote client device, the first sensitive material.

4. The computing device of claim 1, wherein the instructions, when executed by the one or more processors, cause the computing device to:

establish a secure communication tunnel with the instance of the executable tokenization algorithm executing on the remote client device, wherein the instructions, when executed by the one or more processors, cause the computing device to transmit the sensitive material to the remote client device via the secure communication tunnel.

5. The computing device of claim 1, wherein the sensitive material comprises cryptographic material.

6. The computing device of claim 1, wherein the sensitive material comprises a table usable to replace characters in the first data.

7. The computing device of claim 1, wherein the sensitive material comprises at least a portion of a trained machine learning model trained to tokenize data, and wherein the instructions, when executed by the one or more processors, cause the computing device to cause the remote client device to tokenize the first data based on the sensitive material by causing the remote client device to provide, as input to the trained machine learning model, the first data.

8. A method configured to securely federate data tokenization tasks on remote client devices, the method comprising:

causing a remote client device to execute an executable tokenization algorithm by:

transmitting, to the remote client device, the executable tokenization algorithm; and causing the remote client device to store the executable tokenization algorithm in temporary memory;

receiving, from an instance of the executable tokenization algorithm executing on the remote client device, a first version of a request for sensitive material usable to tokenize first data;

transmitting an encrypted challenge token to the remote client device;

receiving, from the remote client device, a second version of the request for the sensitive material, wherein the second version of the request comprises a decrypted form of the encrypted challenge token;

validating the second version of the request for the sensitive material;

transmitting, based on the validating the second version of the request for the sensitive material, the sensitive material to the remote client device;

causing the remote client device to tokenize the first data based on the sensitive material by causing the remote client device to:

generate, by using the executable tokenization algorithm to process the sensitive material, a token that represents a sensitive portion of the first data; and replace the sensitive portion of the first data with the token; and causing the remote client device to delete:

the executable tokenization algorithm from the temporary memory; and the sensitive material.

9. The method of claim 8, further comprising:

receiving, from the instance of the executable tokenization algorithm executing on the remote client device, one or more heartbeat indications, wherein the validating the second version of the request for the sensitive material is further based on the one or more heartbeat indications.

10. The method of claim 8, wherein the sensitive material comprises first sensitive material, and wherein the method further comprises:

storing, for a plurality of different remote client devices, a plurality of different sets of sensitive material; and identifying, from the plurality of different sets of sensitive material and based on an identifier of the remote client device, the first sensitive material.

11. The method of claim 8, further comprising:

establishing a secure communication tunnel with the instance of the executable tokenization algorithm executing on the remote client device, wherein the transmitting the sensitive material to the remote client device is via the secure communication tunnel.

12. The method of claim 8, wherein the sensitive material comprises cryptographic material.

13. The method of claim 8, wherein the sensitive material comprises a table usable to replace characters in the first data.

14. The method of claim 8, wherein the sensitive material comprises at least a portion of a trained machine learning model trained to tokenize data, and wherein the causing the remote client device to tokenize the first data based on the sensitive material comprises causing the remote client device to provide, as input to the trained machine learning model, the first data.

15. One or more non-transitory computer-readable media storing instructions for securely federating data tokenization tasks on remote client devices, wherein the instructions, when executed by one or more processors of a computing device, cause the computing device to:

cause a remote client device to execute an executable tokenization algorithm usable to tokenize input data in accordance with sensitive material by:

transmitting, to the remote client device, the executable tokenization algorithm; and causing the remote client device to store the executable tokenization algorithm in temporary memory;

receive, from an instance of the executable tokenization algorithm executing on the remote client device, a first version of a request for sensitive material usable to tokenize first data;

transmit an encrypted challenge token to the remote client device;

receive, from the remote client device, a second version of the request for the sensitive material, wherein the second version of the request comprises a decrypted form of the encrypted challenge token;

validate the second version of the request for the sensitive material;

transmit, based on the validating the second version of the request for the sensitive material, the sensitive material to the remote client device;

cause the remote client device to tokenize the first data based on the sensitive material by causing the remote client device to:

generate, by using the executable tokenization algorithm to process the sensitive material, a token that represents a sensitive portion of the first data; and replace the sensitive portion of the first data with the token; and cause the remote client device to delete:

the executable tokenization algorithm from the temporary memory; and the sensitive material.

16. The one or more non-transitory computer-readable media of claim 15, wherein the instructions, when executed by the one or more processors, cause the computing device to:

receive, from the instance of the executable tokenization algorithm executing on the remote client device, one or more heartbeat indications, wherein the instructions, when executed by the one or more processors, cause the computing device to validate the second version of the request for the sensitive material based on the one or more heartbeat indications.

17. The one or more non-transitory computer-readable media of claim 15, wherein the sensitive material comprises first sensitive material, and wherein the instructions, when executed by the one or more processors, cause the computing device to:

store, for a plurality of different remote client devices, a plurality of different sets of sensitive material; and identify, from the plurality of different sets of sensitive material and based on an identifier of the remote client device, the first sensitive material.

18. The one or more non-transitory computer-readable media of claim 15, wherein the instructions, when executed by the one or more processors, cause the computing device to:

establish a secure communication tunnel with the instance of the executable tokenization algorithm executing on the remote client device, wherein the instructions, when executed by the one or more processors, cause the computing device to transmit the sensitive material to the remote client device via the secure communication tunnel.

19. The one or more non-transitory computer-readable media of claim 15, wherein the sensitive material comprises cryptographic material.

20. The one or more non-transitory computer-readable media of claim 15, wherein the sensitive material comprises a table usable to replace characters in the first data.

* * * * *